Nov. 20, 1928.

E. A. STALKER

AIRPLANE WING

Filed Sept. 12, 1927

1,691,942

Inventor
Edward A. Stalker

Patented Nov. 20, 1928.

1,691,942

UNITED STATES PATENT OFFICE.

EDWARD A. STALKER, OF ANN ARBOR, MICHIGAN.

AIRPLANE WING.

Application filed September 12, 1927. Serial No. 218,906.

My invention relates to the augmentation of the wing lift by sucking off the boundary layer, and more particularly to an efficient and safe means of accomplishing this suction; by means of a centrifugal blower driven by the flow of air through a turbine located in a suitably designed passage in the wing, thereby utilizing the difference of pressure existing between the upper and lower surfaces of the wing.

Figure 1:
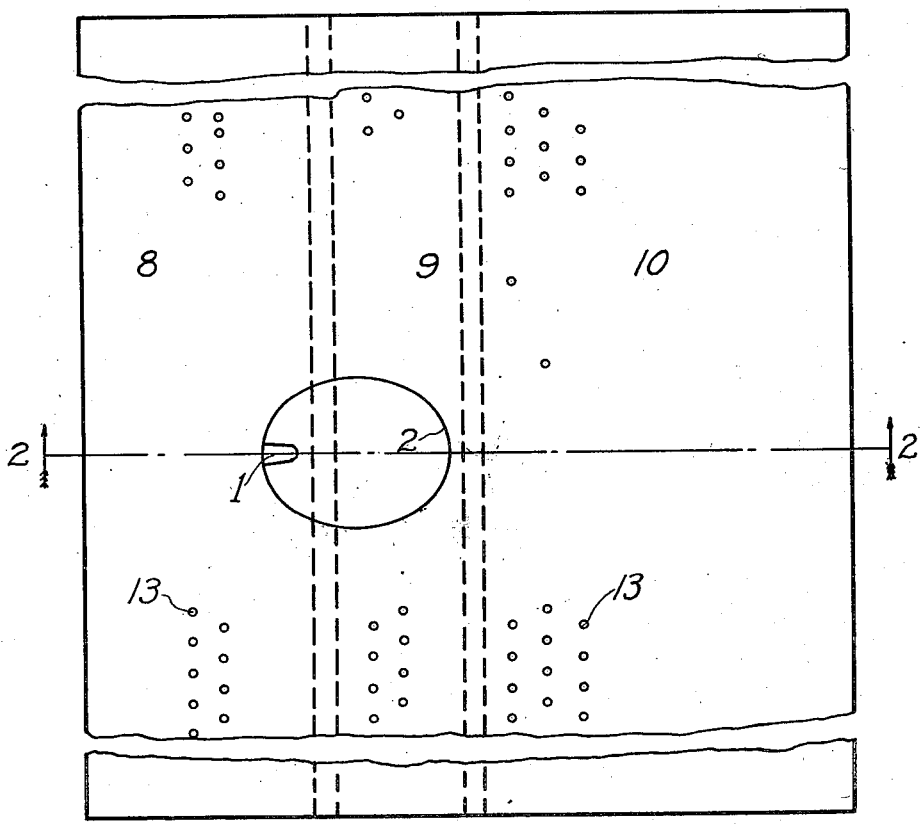
Figure 2:
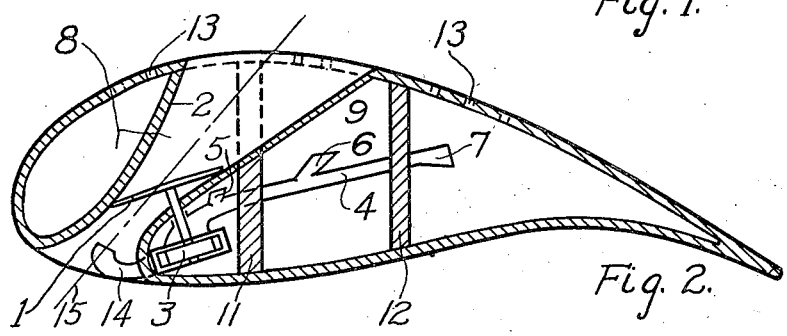
Figure 3:
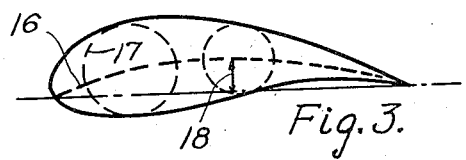

One form of the invention is shown in the accompanying drawing in which Figure 1 is a plan view of the wing and Figure 2 is a vertical section thru the wing passage. Figure 3 defines the wing profile.

The turbine 1 located in the passage 2 drives the centrifugal blower 3 from the suction side of which the manifold 4 has branches 5, 6, and 7 reaching into the compartments 8, 9 and 10 respectively, formed by the wing covering and the walls 11 and 12. Thus different degrees of suction may be created in the different compartments. The suction or depression of pressure existing in the compartments draws in the air on the outside surface of the wing through the holes 13 in the wing surface.

In any air blower creating a suction by centrifugal action the air will be discharged with an appreciable velocity. And since the desired effect is the removal of air from the compartments 8, 9, and 10 with the minimum expenditure of energy, air flowing away from the blower discharge side with appreciable velocity represents a loss of energy. This energy may be regained in part by directing the discharge into the mouth of the wing passage 2 and thus on to the turbine. In Figure 2 the blower discharge pipe 14 directs the discharged air thru the passage 2.

To further improve the efficiency the wind turbine 1 should be located in a Venturi-shaped passage 2 and near the smallest cross-section of the passage. Furthermore the plane of rotation of the turbine should make an angle different from 90° with longitudinal axis 15 of the passage 2.

The wing passage should have its entrance in the region of maximum pressure and its exit in the region of greatest depression. These results are best obtained by placing the passage well toward the leading edge of the wing and in a wing whose thickness is greater than 15% of the length of the wing cross section. And the great depressions on the upper surface are best obtained by having a wing profile or cross section whose mean camber line 16, defined as the line passing thru the centers of circles 17 inscribed in and tangent to the upper and lower wing surfaces of the wing profile is highly arched; that is the maximum ordinate 18 of the mean camber line above the chord 19 subtending its ends is greater than 10% of the wing chord length.

I claim:

1. In combination in a wing possessing one or more compartments, perforations in the wing surface bounding said compartments, a passage connecting the upper and lower surfaces of the wing, an air turbine located in said passage and actuating a means of creating a suction in said compartments.

2. In combination in a wing possessing one or more compartments, perforations in the wing surface bounding said compartments, a passage of Venturi like form connecting the upper and lower surfaces of the wing, an air turbine located in said passage and actuating a means of creating a suction in said compartments.

3. In combination in a wing possessing one or more compartments, perforations in the wing covering bounding said compartments, a passage connecting the upper and lower surfaces of said wing, an air turbine located in said passage and actuating a means of creating a suction in said compartments, said turbine having the axis of its shaft at an angle to the longitudinal axis of the wing passage.

4. In combination in a wing possessing one or more compartments, perforations in the wing-covering bounding said compartments, a passage connecting the upper and lower surfaces of the wing, an air turbine located in said passage and actuating a blower which creates a suction in the said compartments and discharges into the entrance of said passage in the wing.

5. In combination in a wing possessing one or more compartments, and a maximum thickness greater than 15% of the wing chord length, perforations in the wing-covering bounding said compartments, a passage of Venturi like form connecting the upper and lower surfaces of the wing and an air turbine located in said passage and actuating a means of creating a suction in the said compartments.

6. In combination in a wing whose maximum ordinate of the mean camber line is greater than 10% of the wing chord length, one or more wing compartments, perforations in the wing covering bounding said compartments, a passage connecting the upper and lower surfaces of the wing, an air turbine located in said passage and actuating a means of creating a suction in the said compartments.

In testimony whereof I hereunto affix my signature.

EDWARD A. STALKER.